Nov. 27, 1956  A. R. ALLISON ET AL  2,771,777
METHOD OF TESTING ANTIOZODANT CHEMICALS
Filed Sept. 29, 1955  2 Sheets-Sheet 1

INVENTORS
ALBERT R. ALLISON
ALVIN D. DELMAN
BERNARD B. SIMMS
BY George Sipkin
Lee J. Huntzberger
ATTORNEYS Nov. 27, 1956   A. R. ALLISON ET AL   2,771,777
METHOD OF TESTING ANTIOZODANT CHEMICALS
Filed Sept. 29, 1955   2 Sheets-Sheet 2

INVENTORS
ALBERT R. ALLISON
ALVIN D. DELMAN
BERNARD B. SIMMS

United States Patent Office 2,771,777
Patented Nov. 27, 1956

2,771,777
METHOD OF TESTING ANTIOZODANT CHEMICALS

Albert R. Allison and Alvin D. Delman, New York, and Bernard B. Simms, Franklin Square, N. Y., assignors to the United States of America as represented by the Secretary of the Navy Application September 29, 1955, Serial No. 537,599

9 Claims. (Cl. 73—432)

(Granted under Title 35, U. S. Code (1952), sec. 266)

The invention described herein may be manufactured and used by or for the Government of the United States of America for governmental purposes without the payment of any royalties thereon or therefor.

This invention relates to a method for evaluating the protective ability of "antiozodant" chemicals for inhibiting the ozone deterioration of elastomeric materials. The present invention is disclosed by the inventors in a paper entitled "Evaluation of Chemical Protectants as Inhibitors of Ozone-Induced Degradation of GR–S," published in the October 1954, vol. 26 issue of "Analytical Chemistry" on pages 1589–1592. It is intended that this paper be incorporated by reference into the present application.

In recent years, in an effort to improve the stability of elastomeric materials, a great number of chemicals are being manufactured and sold as inhibitors of ozone degradation of such elastomers. Concurrent with the use of such antiozodant chemicals, there has arisen the need for devising a practical means for the evaluation of the efficacy of these chemicals. The procedures which are now in existence for such evaluation generally involve some form of mechanical testing, require bulky and costly equipment, and often, in a large measure, call for the use of personal judgment. As an example, one well known method involves (1) weighing of ingredients (2) blending the ingredients in a mill (3) sheeting out the ingredients (4) vulcanizing the sheet (5) exposing the sheet to ozonized air and (6) measuring the before and after tensile strength, modulus and other physical characteristics for determining the relative extent and depth of cracking of the ozonized elastomer sheet. The method has to be performed with elastomer stock which has not been protected by antiozodant chemicals and with stock which has been so protected.

Accordingly, it is a primary object of the present invention to provide a method for evaluating the protective ability of antiozodant chemicals for inhibiting the ozone deterioration of elastomers which is simple, direct, rapid and uncomplicated by compounding and processing variables and does not require vulcanizate preparations.

In accordance with the present invention, there is provided a method of testing the efficacy of antiozodant materials in the retardation and inhibition of ozone degradation of elastomers. The method comprises the steps of passing ozone through a first solution of an elastomer having a given viscosity and indicating the viscosity of such ozonized first solution. Ozone is then passed through a second solution of the elastomer having such given viscosity, the second solution also containing a small amount of an antiozodant material; and indicating the viscosity of the ozonized second solution whereby a relationship exists between the differences in viscosities of the first and second ozonized solutions from the given viscosity.

Also, in accordance with a particular embodiment of the present invention, there is provided a method of testing the efficacy of antiozodant materials in the retardation and inhibition of ozone degradation of elastomers. This method comprises the steps of bubbling a stream of ozonized oxygen through an o-dichlorobenzene solution containing about 0.5 gram, per 100 milliliters of solution, of an elastomer selected from the group consisting of natural rubber, butadiene-acrylonitrile co-polymer, butadiene-styrene copolymer, alkylene polysulfide, and polychlorprene, at a rate of about 0.05 cubic meter per hour, at a temperature of 15° to 30° C. The viscosity of this ozonized solution is determined by means of a viscosimeter or other suitable device. A stream of ozonized oxygen is bubbled through a second o-dichlorobenzene solution containing the same concentration of elastomer as the first solution and the bubbling rate and temperature is maintained at the same values as was maintained in connection with the first solution. The second solution also contains 1 to 12 parts per hundred parts of elastomer of an antiozodant material such as one selected from the group consisting of N,N'-di-sec-butyl - p - phenylenediamine, nickel dibutyl dithiocarbamate, 6-ethoxy - 1,2 - dihydro-2,2,4 - trimethylquinoline, 1 - (m-aminophenyl) - 2,5-dimethylpyrrole, 65% phenyl - 1 - naphthylamine-35% diphenyl - p - phenylenediamine, and 2,6-di-tert.-butyl-4-methylphenol. The viscosity of the second solution is indicated and a relationship exists between the respective differences of the viscosity of the first and second ozonized solutions from the given viscosity.

Other objects and many of the attendant advantages of this invention will be readily appreciated as the same becomes better understood by reference to the following detailed description when considered in connection with the accompanying drawings wherein.

Figure 1:
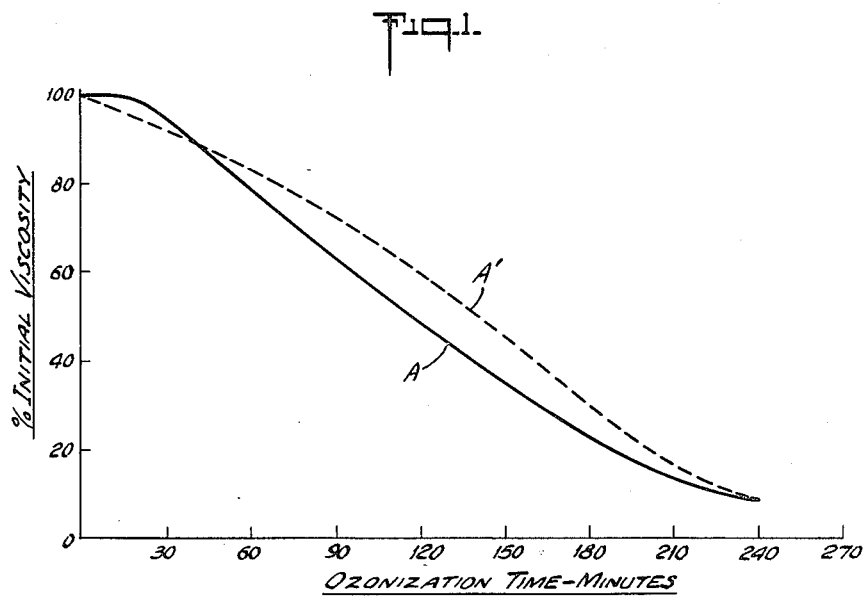
Fig. 1 is a graph indicating a comparison of the variations of per cent initial intrinsic viscosity and per cent initial viscosity index with time of ozonization for a solution of a typical elastomer.

It is known that ozone reacts with unsaturated polymeric materials with a resultant cleavage of the molecular chains. In dilute elastomer solutions, this cleavage is reflected by corresponding decreases in solution viscosity.

The mathematical relationship between viscosity and the degree of polymerization may be expressed by the following formula:

$$[\eta] = KM^a \qquad (1)$$

where $[\eta]$ represents the intrinsic viscosity of a dilute solution of a polymer having a molecular weight M, and K and $a$ are constants which depend upon the polymer-solvent system under investigation. It is, accordingly, evident from Equation 1 that an indication of the extent of polymeric degradation due to ozone attack may be obtained by viscosity measurement.

Typical chemicals selected for investigation of their antiozodant properties were N,N'-di-sec-butyl-p-phenylenediamine, nickel dibutyl dithiocarbamate, 6-ethoxy-1,2-dihydro-2,2,4-trimethylquinoline, 1-(m-aminophenyl)-2,5-dimethylpyrrole, 65% phenyl-1-naphthylamine-35% diphenyl - p - phenylenediamine, 2 - 6 - di - tert - butyl - 4 - methylphenol. Elastomers studied were natural rubber, butadiene-acrylonitrile co-polymer, and butadiene-styrene copolymer known by the trade names Ameripol, GR–S, Hycar, and Perbunan; alkaline polysulfide, known by the trade name, Thiokol and polychlorprene known by the trade names, Duprene and neoprene.

To carry through the method of the present invention, a specimen of elastomer such as a butadiene-styrene copolymer gum was extracted at room temperature with a mixture of ethyl alcohol-toluene azeotrope and 10% distilled water (by volume) to remove any contained antioxidants and residual emulsifying and polymerizing agents. The purified polymer was then dried to constant weight under vacuum, at room temperature. A master batch solution was prepared by dissolving the purified polymer in redistilled o-dichlorobenzene and adjusting the concentration thereof to contain 2 grams of polymer to 100 milliliters of solution. An aliquot portion of the master batch solution was diluted with o-dichlorobenzene to make a solution containing 0.50 gram of polymer per 100 milliliters of solution. This, for convenience, may be described as "the unprotected" solution. A "protected" solution was prepared by dissolving corresponding quantities of one of the above set forth antiozodant chemicals in the unprotected solution as described, the protected solution being made to contain 1 to 12 parts per 100 parts of elastomer of such protectant chemical. It is to be understood that although o-dichlorobenzene was used as the solvent in making these solutions, any elastomer solvent may be used which is not reactive with ozone. Example of such inert solvents are ethylene dichloride, propylene dichloride, methyl-ethyl ketone and toluene. Ozonization of these solutions was carried on by an apparatus such as described in the article by A. R. Allison and I. J. Stanley in volume 24, (1952) Analytical Chemistry, on pages 630–5. A Cannon-Fenske-Ostwald type viscosimeter, having a known calibration constant, was used for making all viscosity measurements.

As set forth by C. E. Schildknecht in the text entitled "Vinyl and Related Polymers" New York, John Wiley and Sons, 1952 on pages 29–34, for practical purposes, a single viscosity measurement of a solution having a concentration of less than 1 gram of polymer per 100 milliliters of solution approximates the intrinsic viscosity. Such single viscosity measurement is generally expressed as viscosity index. In carrying through the present invention, use of such viscosity index obviates the need for the numerous viscosity determinations normally required to determine intrinsic viscosity. Thus, it is seen that the solutions used need not be confined to 0.5 gram of polymer per 100 milliliters of solution hereinabove set forth but it is necessary that the amount of polymer not exceed 1 gram of elastomer per 100 milliliters of solution.

To illustrate the relationship between viscosity index and intrinsic viscosity, in accordance with Schildknecht's teachings, a stream of ozonized oxygen, flowing at a rate of 0.05 cubic meter per hour, was bubbled through 600 milliliters of the polymer solution at room temperature. Aliquot portions of the ozonized solution were then removed, for examination, at preselected time intervals. In Fig. 1, there is presented a comparison of the variations of percent initial intrinsic viscosity and percent initial viscosity index with time of ozonization for the solution of purified butadiene-styrene copolymer gum in o-dichlorobenzene in the concentration of 0.50 gram per 100 milliliters of solution. The abscissa is ozonization time-minutes and the ordinate is percent initial viscosity. Solid line curve A represents viscosity index and dotted line curve A' represents intrinsic viscosity. These data show the substantial similarity between both viscosity relationships. Thus, all viscosity data set forth herein, accordingly, are expressed in terms of viscosity index, since the interchange is a valid approximation.

Figure 2:
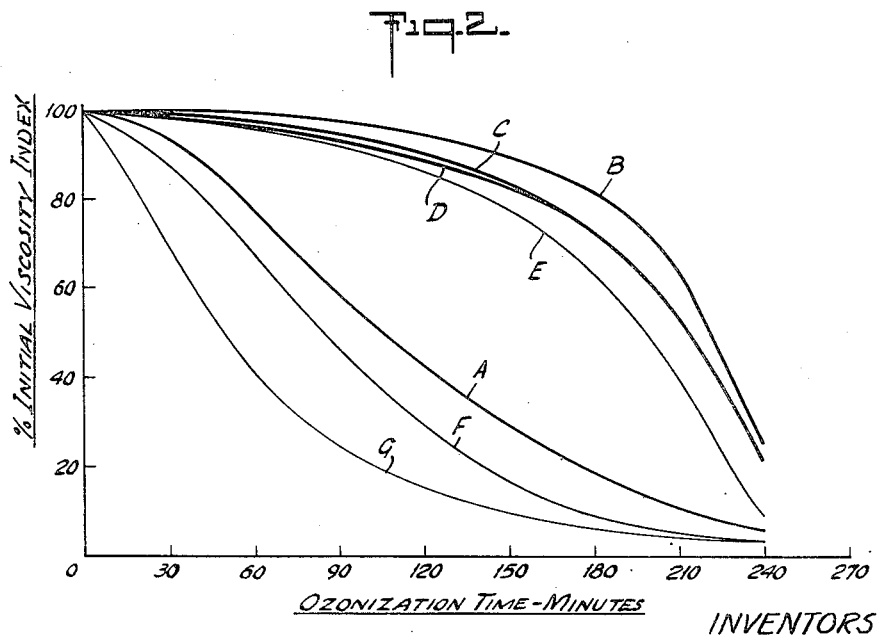
Fig. 2 is a graph showing the effects of antiozodant chemicals upon the rate of ozone degradation of polymer solutions.

To carry through the comparison of viscosity change of an ozonized unprotected solution and an ozonized protected solution, the same process was followed, viz., the stream of ozonized oxygen flowing at a rate of 0.05 cubic meter per hour, was bubbled through 600 milliliters of the protected polymer solution at a temperature of from 15 to 30° C. The range of temperature during ozonization is critical only insofar as it effects the reaction rate. Aliquot portions of the ozonized solution were then removed, for examination, at preselected time intervals. In Fig. 2, the effects of the antiozodant chemicals upon the rate of ozone degradation of the polymer solutions are presented. The abscissa is in ozonization time-minutes and the ordinate is in percent initial viscosity index. Curve B represents the protected solution wherein the antiozodant chemical is N,N'-di-sec-butyl-p-phenylenediamine.

Curve C results from a protected solution containing nickel dibutyl dithiocarbamate. Curve D results from a protected solution containing 6-ethoxyl-1,2-dihydro-2,2,4-trimethylquinoline. Curve E results from a protected solution containing 1 - (m-aminophenyl) - 2,5 - dimethylpyrrole. Curve A results from an unprotected solution. Curve F results from a protected solution containing 65% phenyl - 1 - naphthylamine - 35% diphenyl - p-phenylenediamine. Curve G results from a protected solution containing 2 - 6 - di-tert-butyl - 4 - methylphenol. The curves cover an ozonization period of 4 hours. It is to be seen from Fig. 2 that there is a descending order of protective capacity in the retardation rate of ozone degradation depending on the chemical used as the antiozodant. It is also to be seen from Fig. 2 that the antiozodant chemicals in the solutions causing the results depicted by curves F and G accelerate the rate of ozone degradation.

Figure 3:
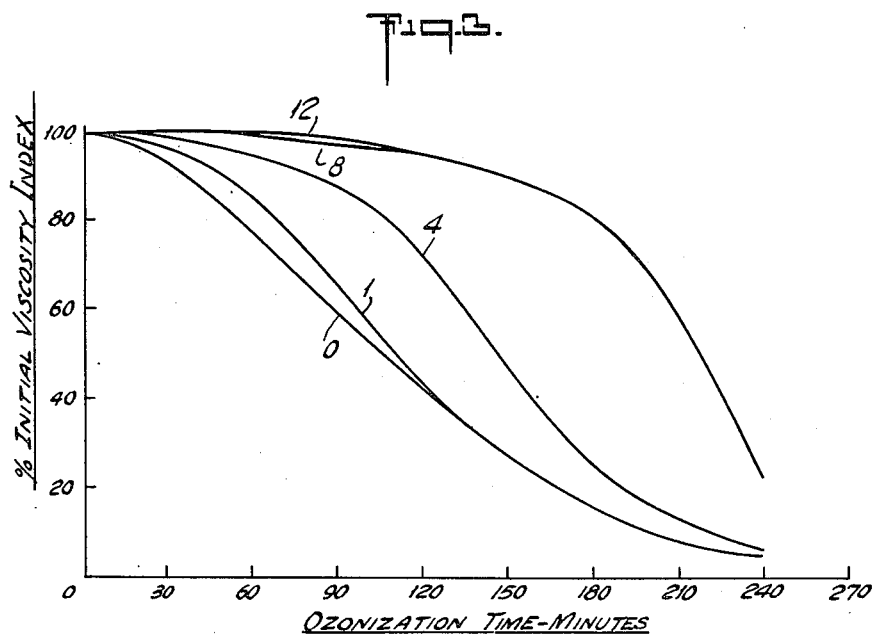
Fig. 3 is a graph showing the changes in percent of initial viscosity index with ozonization time for unprotected polymer solutions and those protected by additions from 1 to 12 parts of N,N'-di-sec-butyl-p-phenylenediamine per 100 parts of elastomer.

The curve of Fig. 3 indicates the changes in percent initial viscosity index with ozonization time for unprotected polymer solutions and those protected by additions of from 1 to 12 parts of N,N'-di-sec-butyl-p-phenylenediamine per 100 parts of elastomer. The numbers on each of the curves set forth the quantity of parts of antiozodant chemical per 100 parts of elastomer in the protected solution. Thus, the maximum inhibiting effects are attained at a concentration of antiozodant chemical of approximately 8 parts per 100 parts of elastomer. An increase in the concentration of the antiozodant chemical to 12 parts per 100 parts of elastomer provides no appreciable change in the protection afforded the elastomer.

Figure 4:
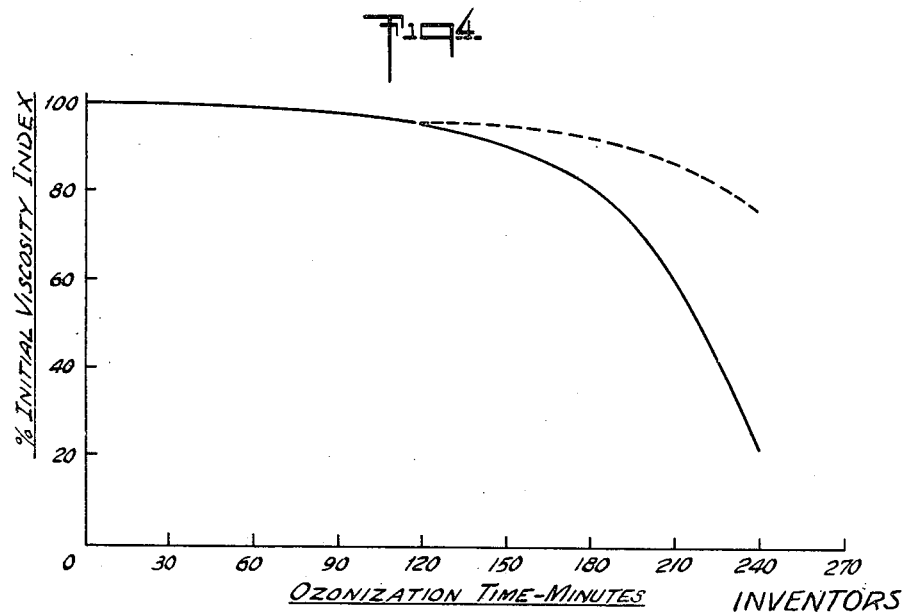
Fig. 4 is a graph which shows the effect of replenishing the antiozodant material in polymer solutions.

In Fig. 4, there is shown the effect of replenishing the antiozodant chemical in polymer solutions. Such effect was determined by adding 10 parts of N,N'-di-sec-butyl-p-phenylenediamine to a protected solution containing this chemical in which the original concentration of 8 parts of this chemical per 100 parts of elastomer had been depleted by about 2 hours ozonization. The dotted line shows that the replenishment of the antiozodant retards the fall-off in viscosity thus indicating that the protective action involves the destruction of the antiozodant chemical.

The validity of the viscosity technique in accordance with the invention described herein was checked by preparing actual vulcanizates containing the antiozodant under study. These compounded and cured specimens were ozonized and the values of the degrees of degradation resulting were compared with the values by viscosity measurements. To carry through such a validity check, a basic butadiene-styrene copolymer compound was prepared in accordance with the method described in the article entitled "Specifications for Government Synthetic Rubbers," section D–4 recipe (b–1), October 1, 1952 of the Reconstruction Finance Corp., Office of Synthetic Rubbers. Compounds protected by N,N'-di-sec-butyl-p-phenylenediamine, nickel dibutyl dithiocarbamate, 6 - ethoxy - 1,2 - dihydro - 2,2,4 - trimethylquinoline, and 2,6 - di-tert-butyl - 4 - methylphenol were prepared by incorporating a quantity of these chemicals equivalent to 8 parts per 100 parts of rubber into the unprotected compound prior to curing. All of the specimens were cured in standard 6 x 6 x 0.075 inch ASTM molds for 35 minutes at 295° F. Experimental 1 x 6 inch test strips of the above unprotected and protected vulcanizates were elongated 20% and ozonized for 7 minutes at room temperature in a stream of ozonized oxygen flowing at 0.1 cubic meter per hour. The apparatus used for ozonization was the same as that used in ozonizing the protected and unprotected solutions, i. e., that described in the referred to article by Allison and Stanley in Analytical Chemistry.

The extent of ozone cracking was determined by the surface replica technique. Surface replicas were obtained of each specimen before and after ozonization. The surface replica technique utilized involves three distinct phases: the casting of a film of cellulose acetate over the ozonized specimen, stripping the resultant replica from the surface, and mounting the replication to facilitate detailed examination. The inhibiting effects of the antiozodants are evaluated by making photomicrographs of these replicas to examine the relative changes in surface characteristics of the ozonized vulcanizates protected by the different antiozodants under investigation. The inhibiting effects of the antiozodant chemicals were also evaluated by the crack depth measurements. The indications of protective effect exhibited by the chemicals studied by these check methods closely paralleled those obtained by the viscosity technique of the present invention, thus establishing the validity of such technique.

Obviously many modifications and variations of the present invention are possible in the light of the above teachings. It is therefore to be understood that within the scope of the appended claims the invention may be practiced otherwise than as specifically described.

We claim:

1. A method of testing the efficacy of antiozodant materials in the inhibition of ozone degradation of elastomers which comprises the steps of passing ozone through a first solution of an elastomer having a given viscosity, the solvent thereof being non-reactive with said ozone; indicating the viscosity of the ozonized first solution; passing ozone through a second solution of said elastomer having said given viscosity, said second solution also containing a small amount of an antiozodant material; and indicating the viscosity of the ozonized second solution whereby a relationship exists between the respective differences in viscosities of said first and second ozonized solutions from said given viscosity.

2. A method of testing the efficacy of antiozodant materials in the inhibition of ozone degradation of elastomer comprising bubbling ozonized oxygen through a first solution of an elastomer having a given viscosity, the solvent being non-reactive with said ozone, the elastomer being selected from the group consisting of natural rubber, butadiene-acrylonitrile co-polymer, butadiene-styrene copolymer, alkylene polysulfide and polychlorprene; indicating the viscosity of the first ozonized solution; bubbling ozonized oxygen through a second solution of said elastomer having said given viscosity, said second solution also containing a small amount of an antiozodant material; and indicating the viscosity of the ozonized second solution whereby a relationship exists between the respective differences in the viscosities of said first and second ozonized solutions from said given viscosity.

3. A method of testing the efficacy of antiozodant materals in the inhibition of ozone degradation of elastomers comprising bubbling ozonized oxygen through a first solution of an elastomer having a given viscosity, the elastomer being selected from the group consisting of natural rubber, butadiene-acrylonitrile co-polymer, butadiene-styrene copolymer, alkylene polysulfide and polychlorprene, the solvent being selected from the group consisting of o-dichlorobenzene, ethylene dichloride, propylene dichloride, ethyl-methyl ketone and toluene; indicating the viscosity of the first ozonized solution; bubbling ozonized oxygen through a second solution of said elastomer having said given viscosity, said second solution also containing a small amount of said antiozodant material under test; and indicating the viscosity of the ozonized second solution whereby a relationship exists between the respective differences in the viscosities of said first and second ozonized solutions from said given viscosity.

4. A method of testing the efficacy of antiozodant materials in the inhibition of ozone degradation of elastomers comprising bubbling a stream of oxygen containing a predetermined concentration of ozone at a chosen rate through a chosen volume of a solution of an elastomer having a given viscosity, the solvent being non-reactive with ozone, the concentration of said elastomer in said first solution not exceeding 1 gram per 100 milliliters of solution; indicating the viscosity of said first ozonized solution; bubbling said stream of oxygen containing said predetermined concentration of ozone at a chosen rate through a second solution containing said concentration of said elastomer and having said given viscosity, said second solution also containing the antiozodant material under test; and indicating the viscosity of the ozonized second solution whereby a relationship exists between the respective differences in the viscosities of said first and second ozonized solutions from said given viscosity.

5. A method of testing the efficacy of antiozodant materials in the inhibition of ozone degradation of elastomers comprising bubbling a stream of ozonized oxygen through a first solution of an elastomer of a given viscosity at a rate of about 0.05 cubic meter per hour, the concentration of said elastomer in said first solution being from 0.25 to 1 gram per 100 milliliters of solution, the solvent being non-reactive with ozone; indicating the viscosity of said first ozonized solution; bubbling a stream of ozonized oxygen through a second solution having said concentration of elastomer at said rate, said second solution also containing in the ratio of 1 to 12 parts per 100 parts of elastomer of an antiozodant material under test; and indicating the viscosity of said ozonized second solution whereby a relationship exists between the respective differences of said first and second ozonized solutions and said given viscosity.

6. A method as defined in claim 5 wherein said first and second solutions are maintained at a temperature of 15° to 30° C. during the bubbling through of said ozonized oxygen.

7. A method as defined in claim 5 wherein there is utilized as said elastomer in said solutions, a material selected from the group consisting of natural rubber, butadieneacrylonitrile co-polymer, butadiene-styrene copolymer, alkylene polysulfide, and polychlorprene.

8. A method as defined in claim 5 wherein there is utilized as said solvent in said solutions, a material selected from the group consisting of o-dichlorobenzene, ethylene dichloride, propylene dichloride, ethyl methyl ketone and toluene.

9. A method of testing the efficacy of antiozodant materials in the inhibition of ozone degradation of elastomers comprising bubbling a stream of ozonized oxygen through an o-dichlorobenzene solution of a given viscosity and containing about 0.5 grams of an elastomer selected from the group consisting of natural rubber, butadiene-acrylonitrile co-polymer, butadiene-styrene copolymer, alkylene polysulfide and polychlorprene, at a rate of about 0.05 cubic meter per hour through 600 milliliters of solution at a temperature from 15° to 30° C.; indicating the viscosity of said first ozonized solution; bubbling a stream of ozonized oxygen through a second o-dichlorobenzene solution containing said concentration of said elastomer at said rate and said temperature, said second solution also containing 1 to 12 parts per 100 parts of elastomer of an antiozodant material selected from the group consisting of N,N'-di-sec-butyl-p-phenylenediamine, nickel dibutyl dithiocarbamate, 6-ethoxy-1,2-dihydro-2,2,4 - trimethylquinoline, 1 - (m - aminophenyl) - 2,5 - dimethylpyrrole, 65% phenyl-1-naphthylamine-35% diphenyl-p-phenylenediamine, and 2,6-di-tert-butyl-4-methyl phenol; and indicating the viscosity of said second solution whereby a relationship exists between the respective differences of the viscosities of said first and second ozonized solutions from said given viscosity.

References Cited in the file of this patent

UNITED STATES PATENTS

| | | |
|---|---|---|
| 2,641,128 | Black | June 9, 1953 |
| 2,709,359 | Koch et al. | May 31, 1955 |